April 29, 1941.  M. ARTZT  2,239,768
CONSTANT SUPPLY SYSTEM FOR PHOTOELECTRIC APPARATUS AND THE LIKE
Filed Dec. 21, 1937   2 Sheets-Sheet 2
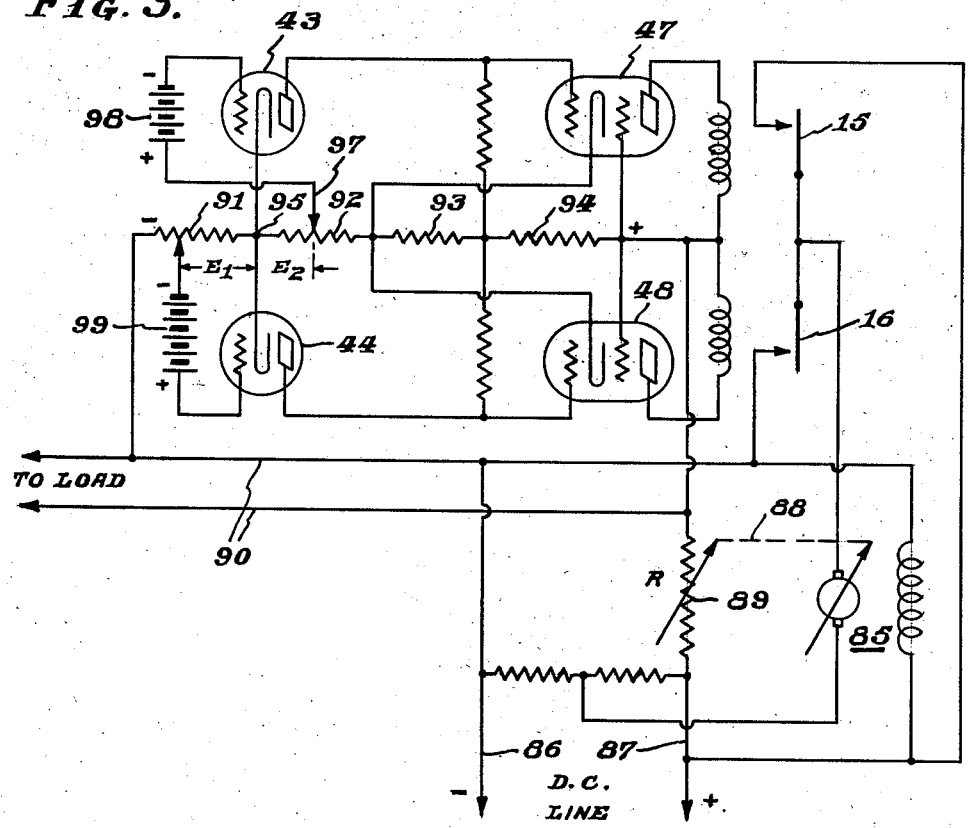
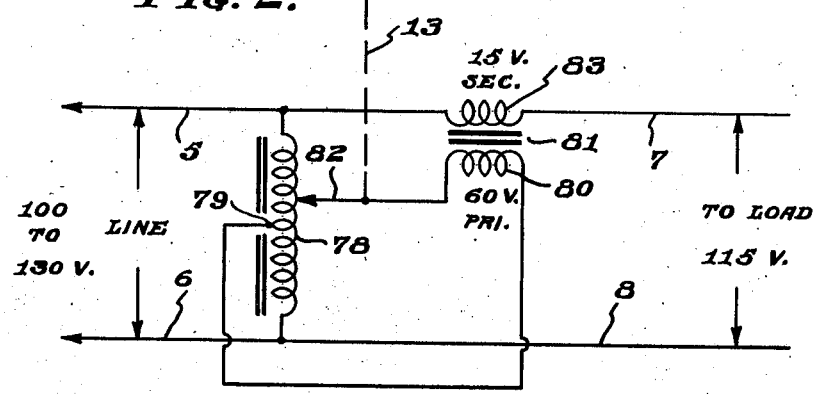
Inventor
*Maurice Artzt*
By
Attorney Patented Apr. 29, 1941

2,239,768

UNITED STATES PATENT OFFICE 2,239,768

CONSTANT SUPPLY SYSTEM FOR PHOTOELECTRIC APPARATUS AND THE LIKE

Maurice Artzt, Haddonfield, N. J., assignor to Radio Corporation of America, a corporation of Delaware Application December 21, 1937, Serial No. 180,982

2 Claims. (Cl. 171—119)

The present invention relates to a constant voltage power supply system which is particularly adapted for supplying energy to photoelectric apparatus, phototube exciter lamps, and the filament and plate supply of direct current amplifiers and the like, and has for its object to provide voltage regulation without distortion of the wave shape of the supply in an alternating current system.

Constant voltage, as well as substantially distortionless wave shape, is important in the apparatus above referred to, because the lamp brilliance and filament emission of the apparatus varies with the root mean square value, and the plate supply varies with the average value of the supply power.

It is, therefore, a further object of the invention to provide an improved current or voltage regulator for alternating currents which operates to maintain both current or voltage and form factor. Many systems heretofore used and including grid-controlled gaseous rectifiers or saturation rectifiers have been found unsatisfactory for this purpose, as they tend seriously to distort the wave form of the supply voltage or current.

It is also a further object of the present invention to provide a distortionless current or voltage regulator for alternating currents which is dependable and stable in operation.

The invention will, however, be better understood from the following description when considered in connection with the accompanying drawings, and its scope will be pointed out in the appended claims.

In the drawings

Figure 2 is a further schematic circuit diagram showing a modification of a portion of the circuit of Fig. 1; and Figure 3 is a schematic circuit diagram of a further modification of the circuit of Fig. 1 as applied to direct current supply circuits.

Figure 1:
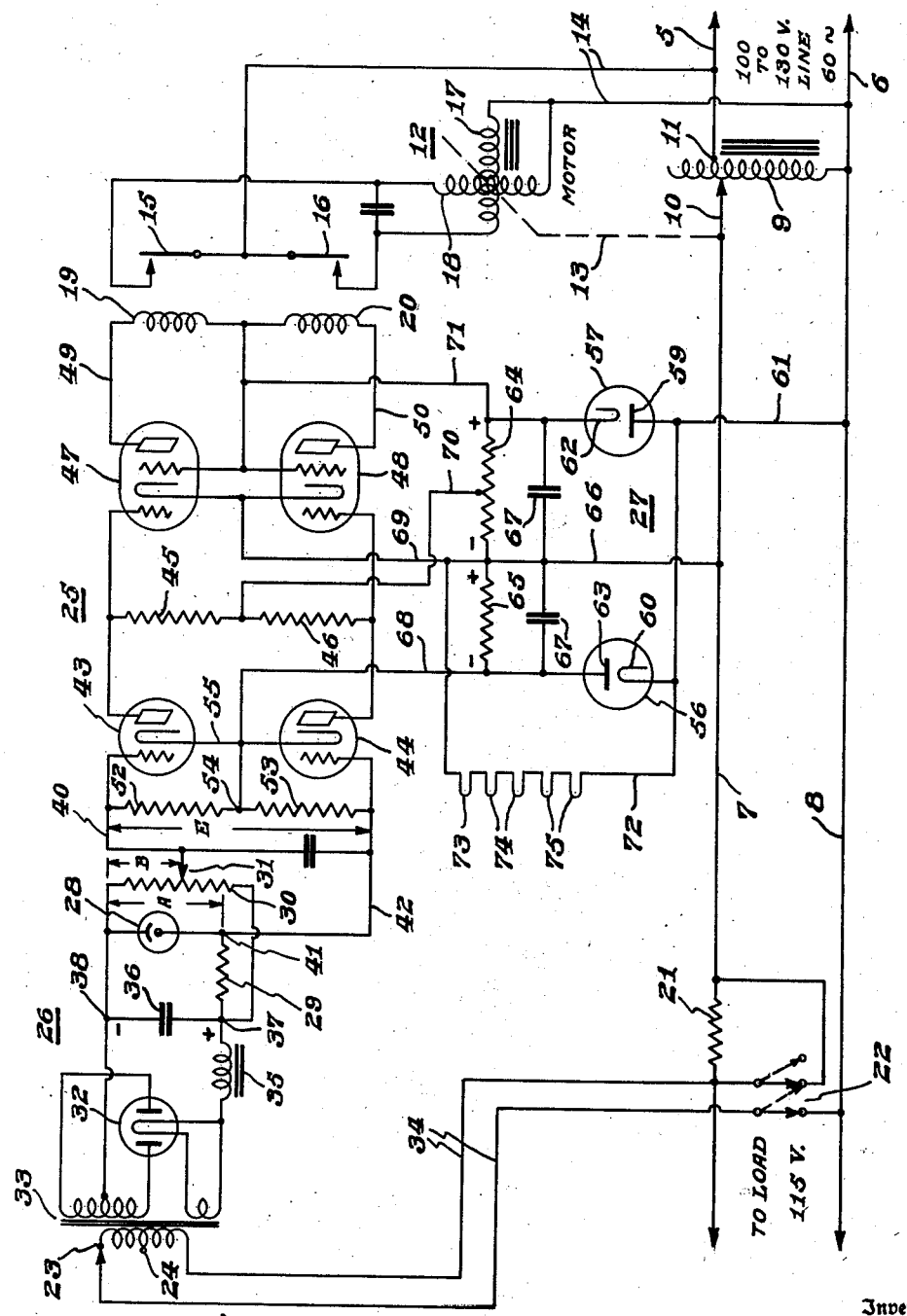
Figure 1 is a schematic circuit diagram of a constant voltage or current power supply system for alternating currents, embodying the invention.

Referring to Fig. 1, 5 and 6 are alternating current power supply lines arranged to supply energy to an output circuit comprising output lines 7 and 8, which may be connected to any suitable load, such as the apparatus hereinbefore referred to and which may be sensitive to change in wave form, as well as the value of the supply voltage or current.

Between the supply lines 5 and 6 and the output or load lines 7 and 8, there is connected a regulator device, such as an auto transformer 9, provided with a variable output tap connection 10 which may be moved with respect to a fixed tap 11 on the input side of the transformer, to increase and decrease the voltage output with respect to that of the supply. A preferred form of this transformer is commercially available on the market and is known as a "Variac."

The range of control provided by the transformer or regulator device per se, is such that a desired constant voltage may be maintained across the output circuit with predetermined or normal variations in the input or supply voltage from the supply line.

In the present example, a relatively wide voltage variation from 100 to 130 volts at 60 cycles alternating current is assumed and has been used to provide a constant load voltage of 115 volts, as indicated.

The transformer is, furthermore, such that it does not introduce distortion of the wave shape of the supply voltage at the selected frequency, and is controlled automatically by means which is likewise not subject to distortion of the supply voltage.

For this purpose, the output voltage across the lines 7 and 8 is controlled by the contact 10, which is automatically maintained in the correct setting by a small motor drive indicated at 12 and the dotted connection 13 therewith to the contact 10. The motor is energized through lines 14 connected with the lines 5 and 6 on the supply side of the transformer 9, through reversing switches 15 and 16, in circuit, respectively, with two reversing windings 17 and 18 for the motor. The motor is preferably of the permanent magnet type and is operated in one direction or the other by closure of the switches 15 or 16.

The switches are of the type which may be actuated electrically by means of energizing windings 19 and 20 and represent any suitable electrically operated switches of the relay type. The switches are normally in the open circuit position as shown and are closed when either of the relay coils 19 and 20 are energized.

The regulator further comprises a multi-stage amplifier 25, an alternating current rectifier and system, as indicated at 26, for comparing the voltage or current delivered by the transformer 9 with a desired regulated value, and a power supply system 27 for the amplifier 25, all of the latter being arranged to take energy from the regulated side of the transformer 9, that is, from the power output lines 7 and 8.

The system for comparing the voltage or current delivered by the regulator device 9 to the desired regulated value comprises two potentiometer circuits in parallel, the first of which includes at least one constant voltage device, such as a glow tube 28, and a resistor 29 in series, and the other of which comprises at least one resistance element 30 having a variable output tap connection 31.

The potentiometer circuits are supplied with direct current from an alternating current rectifier 32 energized from the transformer 33 through supply lines 34 connected with the load or output circuit 7—8.

The rectifier is preferably of the full wave type, as shown, and is provided with an output filter reactor 35 and shunt filter capacitor 36. Operating potential for the potentiometer circuits is taken from the rectifier at the output terminals indicated at 37 and 38, having polarities as indicated.

The glow tube represents any suitable device for maintaining substantially constant voltage drop across it and, in the present example, may be provided by a type known commercially as the RCA—874. The potentiometer contact 31 is connected to an input lead 40 for the amplifier 25, and a terminal 41 between the glow tube 28, and the resistor 29 is connected through a second input lead 42 to the amplifier 25. The terminal 41 and the tap 31 provide output connections for the rectifier and voltage comparing means, between which terminals a variable voltage may be established in accordance with variations in the output voltage across the lines 7 and 8.

The arrangement shown is such that two circuits are provided in the comparison system 26, one of which, 28—29, is regulated to a constant voltage A, and the other of which, 30, or B, varies with changing input voltage from the load circuit 7—8. In this case, the voltage A, which may be 90 volts across the tube 28, and the voltage B, established by adjustment of the contact 31 initially will be the same when the desired output voltage is established at the load, such as 115 volts. Any increase or decrease in the output voltage from the regulator device 9 changes the voltage B more than the voltage A and develops a voltage E at the input of the rectifier across the leads 40 and 42. The amplitude and polarity of the voltage E is determined by the amount and direction of unbalance between the voltages A and B.

The amplifier 25 consists of a two-stage push-pull D.-C. amplifier arranged as shown in such a manner that the first stage tubes indicated at 43 and 44 are normally at zero bias and the resulting plate current of these tubes, directly coupled through resistors indicated at 45 and 46 to the second stage amplifier tubes 47 and 48, maintain the latter tubes at the plate current cut-off point so that the current through the relay coils 19 and 20 connected in the output circuits 49 and 50 of the amplifier output tubes is substantially zero or minimum.

The input circuit for controlling the first stage amplifier tubes comprises two series connected grid resistors 52 and 53 across the input leads 40 and 42 of the amplifier and across the input voltage E. A tap 54 between the resistors 52 and 53 is connected to the cathode circuit 55 of the tubes 43 and 44, and the input leads 40 and 42 are connected with the control grids of the input tubes 43 and 44, as indicated. With this arrangement, the voltage drop across the resistors 52 and 53 resulting from the application of voltage E to the input leads 40 and 42 is applied to the control grids of the input tubes with respect to the cathode connection 54.

In case of an unbalance between the comparison voltages A and B, one of the input tubes is driven toward cut-off, the one selected depending upon the polarity of the voltage E. This relieves the cut-off bias of the corresponding output or second stage tube, and with increased plate current, the relay in its output plate circuit will be closed. An unbalance in the opposite direction does not affect this relay, but operates to cause the other relay to close in a similar manner as just described.

The relays close the motor circuit by energizing the proper winding to adjust the voltage controlling contact 10 on the regulator device in a direction to reestablish the balance between the comparison voltages A and B. When this point is reached, the relay is opened and the motor stops. Thus, a self-balancing bridge is obtained which is continuously and automatically readjusting itself to hold the voltage B equal to the voltage A, and by so doing, holds the output voltage across the output lines 7 and 8 at a constant value.

The motor windings may be energized directly from the amplifier instead of through the relays, in which case the coils 19 and 20 may be considered to be the motor reversing windings and will operate in the same manner as described for the relay coils to take current from the amplifier and cause operation of the motor in one direction or the other, or stopping when zero or balanced current output is established.

By utilizing the voltage drop in a series impedance or resistor device 21 in the output or load circuit, as the supply voltage for the comparison bridge network 26, the system may operate to regulate for constant current instead of constant voltage. This may be placed in circuit by a switch 22 arranged normally to short circuit the resistor device 21 as shown and to connect the leads 34 across the resistor when moved to an alternate switching position as shown in dotted lines. The transformer may be adjusted to provide the same secondary voltage by changing an input tap 23 to a lower input voltage tap 24.

The system then operates to regulate the comparison voltages A and B in response to current changes on the load circuit in the same manner as described for voltage changes.

The plate supply of each stage is obtained from a separate rectifier circuit so that changes in the plate current of the output tubes 47 and 48 may have substantially no affect on the first stage. Furthermore, all filament, all cathode heating current and plate power for the amplifier is obtained from the regulated side of the controlling device 9. By this arrangement, the tube system is maintained at its original voltages and the D.-C. amplifier system is stable. Likewise, any variation in the glow tube regulator in the comparison voltage circuit is avoided since it is permitted to operate always on the same part of its characteristic, being supplied with operating voltage through the separate rectifier circuit 26.

In the present example, the separate plate or anode supply for each stage is obtained through separate rectifiers indicated at 56 and 57, in practice provided by one tube of the type known commercially as the RCA—25Z5. In this system, the plate 59 in one rectifier is connected in parallel with the cathode 60 of the other rectifier to one side of the output circuit 8, as indicated by the connection 61, and the remaining cathode 62 of the one rectifier and the remaining anode 63 of the other rectifier are connected respectively through separate output resistors 64 and 65 to the opposite side 7 of the output circuit, as indicated by the connection lead 66. Suitable filter capacitors 67 are provided across the output resistors 64 and 65.

The cathode connections 68 and 69 and the anode and screen grid connections 70 and 71 are made at suitable terminals on the output resistors 64 and 65 to provide proper operating potentials on the various electrodes whereby the direct current amplifier may function as described. The filament or cathode heating circuit indicated at 72 is also placed across the output lines 7 and 8 by the connection shown and comprises a series circuit in which the heater for the rectifier 56—57 is indicated at 73; the heaters for the output tubes 47 and 48 are indicated at 74; and the heaters for the first stage tubes 43 and 44 are indicated at 75.

The accuracy of control is largely a function of the sensitivity of the amplifier 25 and the differential voltage E. It is, therefore, desirable that the amplifier have a high degree of sensitivity and that the differential voltage be made as high as practicable, and, for the latter purpose, it should be understood that more than one constant voltage device or regulator tube 28 may be utilized in the circuit shown to increase the voltage available for regulating and comparison purposes. For example, if the comparison is made at 180 volts instead of 90, it will be seen that the differential voltage is doubled for a given error in the adjustment of the regulator and twice the sensitivity in resetting may be obtained.

In certain regulator systems, it may be desirable to use a booster transformer to raise or lower the input voltage where the power requirements are large, since the booster transformer involves the use of a low voltage secondary in series with the line and capable of carrying large currents. A modification of the regulator device 9 in accordance with this is shown in Fig. 2, to which attention is now directed.

The regulator in this system comprises a transformer winding 78 connected across the input or supply lines 5 and 6 and having a center tap 79 connected through the primary winding 80 of a booster transformer 81 to the movable regulator contact 82. This contact is movable in connection with the winding 78 to and on opposite sides of the center tap 79, whereby a boosting or bucking voltage may be applied to the primary winding 80 of the booster transformer 81, depending upon the position of the contact 82. The latter contact is placed under control of the motor through connection 13, as indicated. The secondary of the transformer 81, indicated at 83, is connected in series with the supply line 5 and between it and the output or load line 7. The load line 8 is connected directly with the supply line 6.

With this arrangement, the variable arm 82 is driven by the motor under control of the amplifier, and the entire voltage range of the system is available across the winding 78 to raise or lower the output voltage across the lines 7 and 8 through the transformer 81. In this system, if the variable load only is supplied from a 500 watt device at 78, assuming substantially 100 percent efficiency, the system can supply greater than 2 kva. instead of .5 kva., as would be the case if the device 78 were utilized directly in circuit as indicated at 9 in the circuit of Fig. 1. The booster transformer 81 may then have a 60 to 15 volt step down with a 300 watt capacity.

Referring now to Fig. 3, for a direct current line, the two-stage push-pull direct current amplifier comprising the first stage tubes 43 and 44, and the second stage or output tubes 47 and 48, may be arranged to control the relay switches 15 and 16 in connection with a direct current motor 85, which is energized from a direct current supply line indicated at 86 and 87.

The motor is connected, as indicated at 88, to operate a variable series controller or resistor 89 connected between one side of the supply line and one side of the output or load line 90. Operating voltages for the tubes of the amplifier are obtained from a bleeder resistor connected across the output lines 90 and comprising series connected sections 91, 92, 93 and 94 connected in the order named between the positive and negative sides of the output or load line 90. The cathodes of the two input tubes 43 and 44 are connected, as in the preceding embodiment, with a center tap 95 between the resistors 91 and 92, and the control grids are each connected through adjustable taps 96 and 97 on the separate resistors as shown in such a manner that, as the supply voltage increases, one grid becomes more positive and the other grid becomes more negative, causing a change in a balanced voltage which is a condition obtained initially by placing in circuit with the grids, suitable biasing potential means such as batteries indicated at 98 and 99. Biasing batteries have been found suitable for this purpose since there is no current drain and the life of such batteries is substantially that of the tubes.

In this system, therefore, the control grids or input leads of the direct current amplifier are connected to terminals on opposite sides of a cathode connection with a resistor connected across a source of potential to be regulated. As in the preceding example, the tubes are biased substantially zero intially and the output tubes 47 and 48 operate at substantially plate current cut-off initially when the system is balanced. Any variation of the supply voltage or variation in load causing a change in the output voltage disturbs the balance of the voltages on the grids of the input tubes and causes one or the other of the relays 15 and 16 to operate. The motor 85 then moves the adjustment of the controller 89 to restore the balance, which, in the present example, is that between two voltages $E_1$ and $E_2$ in conjunction with the voltages fixed by the batteries 98 and 99.

The potential $E_1$ regulates against the potential at 99 and the potential $E_2$ regulates against the potential at 98.

From the foregoing description, it will be seen that in a constant voltage or current supply system, a controlling device for the flow of energy between a supply circuit and a low circuit is provided with a movable control element actuated by a reversible electric motor under control of the output current from a direct current amplifier, the output tubes of which are normally biased substantially to cut off, and in the output circuit of which the current is balanced. The output amplifier stage is controlled by an input stage which applies a cut off bias to the output stage in response to substantially zero bias on the input stage.

The input bias is controlled by a potentiometer network which includes at least one constant voltage source and a variable voltage source responsive to changes in the flow of energy in the load circuit. This may be current or voltage change and, in the case of alternating currents, is provided by a separate rectifier and two potentiometer circuits connected to the input circuit of the amplifier to provide the differential voltage when the load current or voltage varies from a predetermined value.

It should also be noted that, in the case of alternating currents, the amplifier input and output stages are supplied with anode current from separate rectifiers, preferably so connected that the rectifiers may be included in a single rectifier device having a common circuit connection with the amplifier while isolating the potential supply circuits thereof as shown in Fig. 1.

In the voltage comparison system employed in the input circuit of the balanced amplifier, two circuits are provided, one of which is regulated to a constant voltage and one of which varies with changing input voltage supply, and the differential voltage is applied to the amplifier input circuit to actuate it in one direction or the other, thereby to provide an unbalance in the output current for controlling the operation and direction of rotation of the motor means.

I claim as my invention:

1. In a regulated power supply system, a control circuit comprising in combination, an amplifier having a balanced input circuit and two amplifier tubes having control grids connected therewith in balanced relation, a rectifier connected with said system for rectifying a voltage established in the output circuit thereof, a pair of parallel connected output circuits for said rectifier including a voltage regulator device and a resistor serially in one circuit and a resistor having a tap in the other circuit, and means for establishing an input connection for said amplifier with said tap connection for one input tube grid and with a tap connection between said regulator device and series connected resistor for the other input grid connection.

2. In a regulated power supply system, the combination of a two-stage balanced direct current amplifier having a pair of input grids for the first stage and having a balanced output circuit for the second stage, means in said amplifier for establishing substantially zero anode output current in response to substantially zero bias on said input grids, means responsive to an unbalance in the output current of said amplifier for regulating said system, means providing two serially connected control circuits for said input grids, means for applying rectifier output current from said system to said parallel connected circuits, one of said parallel connected circuits including a regulator device and a resistor in series and the other of said control circuits including a resistor having a variable tap, and means providing an input connection for said control grids with said rectifier through said tap and a connection between said regulator device and series connected resistor.

MAURICE ARTZT.